Patented Feb. 5, 1924.

1,482,792

UNITED STATES PATENT OFFICE.

MINER L. HARTMANN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

PROCESS OF TREATING THE SURFACES OF CRYSTALLINE MINERAL MATERIALS.

No Drawing. Application filed May 12, 1920, Serial No. 380,763. Renewed July 17, 1922. Serial No. 575,637.

*To all whom it may concern:*

Be it known that I, MINER L. HARTMANN, residing at Niagara Falls, Niagara County, New York, have invented a new and useful Improvement in Processes of Treating the Surfaces of Crystalline Mineral Materials, of which the following is a full, clear, and exact description.

This invention relates to a new process for treating the surfaces of crystalline mineral materials; and its object is to etch, pit or roughen the grain surfaces and thereby increase their bonding qualities. This treatment is suitable for use with a large number of natural and artificial abrasives and refractories, such as silicon carbide, fused crystalline aluminous abrasives and naturally occurring crystalline minerals, such as corundum, emery, garnet, quartz, silica sand and the like; and in the following description and claims, the term "crystalline mineral materials" is to be understood to include artificial abrasives and refractories, such as silicon carbide, fused crystalline aluminous abrasives, and naturally occurring crystalline minerals, such as corundum, emery, garnet, quartz, silica sand and the like.

When abrasive grains are held to other bodies or together by a bonding material, such as glue, rubber, shellac, vitrified clay, cement or other bonding materials, the efficiency of the abrasive article depends largely upon the adhesive strength between the grain surfaces and the bonding material.

I have discovered that by suitable means, the more or less smooth surfaces of crystalline mineral grains may be etched, pitted or roughened so that the adhesive strength between the grain and the bonding material is greatly increased.

In carrying out my invention, the grains are heated in contact with small particles of a halogen salt, more or less evenly distributed over the grain surfaces, to a temperature sufficient to produce a surface reaction between the halide and the crystalline mineral material, but insufficient to produce glazing of the surface.

As an illustration of the method of practicing my invention, the material, for example, fused crystalline aluminous abrasive made by any of the well known methods, in grain form, is moistened with a saturated solution of sodium fluoride. The moistened grain is then heated to about 500° C. for about one hour. A saturated solution of sodium fluoride is approximately four per cent, therefore a small percentage by weight of the salt is left on the material. The amount of the salt left on the material is not more than one or two per cent of the weight of the material itself. After cooling, the grain may be washed with water, dried, and is then ready to be used in the abrasive article.

The crystalline mineral material used in my process may be crushed to the sizes required for the subsequent manufacture of abrasive articles, before treatment, or it may be crushed after treatment, although the former method is preferred, because by it all the surfaces of each grain are etched, pitted or roughened when treated by my process.

The method of distribution of the salt on the grain surfaces is not limited to moistening the grain with a solution of the salt and evaporating the liquid, but alternative processes may be used which distribute the salt particles more or less evenly over the grain surfaces.

The effectiveness of my invention for etching, pitting or roughening the surfaces of abrasives and refractory grains, and thereby improving the bonding strength between grain surfaces and bonding material, may be proven not only by examination under the high-power microscope, but also by means of the increased tensile strength of bonded articles made with grain treated by my new process. By the use of that particular method above described, I have in one case increased the bonding strength of aluminous abrasive and glue by more than two hundred per cent, and in all cases, the bonding strength has been greatly improved.

I claim:

1. The process of treating the surface of crystalline mineral material which consists in heating said material in contact with a halogen salt to a temperature sufficient to produce a surface reaction between said material and said salt but insufficient to produce glazing of the surface of said material.

2. The process of treating the surface of crystalline mineral material which consists in heating said material in contact with less than two per cent by weight of a halogen salt to produce a surface reaction between said material and said salt.

3. The process of treating the surface of crystalline mineral material which consists in heating said material in contact with less than two per cent by weight of a halogen salt to a temperature sufficient to produce a surface reaction between said mineral and said salt but insufficient to produce glazing of the surface of said material.

4. The process of treating the surface of abrasive refractory materials which consists in heating said materials in contact with less than two per cent by weight of a halogen salt to a temperature sufficient to produce a surface reaction between said abrasive refractory materials and said salt.

5. The process of treating the surface of abrasive refractory materials which consists in heating said materials in contact with less than two per cent by weight of a halogen salt to a temperature sufficient to produce a surface reaction between said abrasive refractory materials and said salt, but insufficient to cause glazing of the surface of the said abrasive refractory material.

6. A process of etching the surface of fused crystalline aluminous abrasive grains, which consists in heating said grains in contact with less than two per cent by weight of a halogen salt to a temperature sufficient to produce a surface reaction between said grains and said salt but insufficient to cause glazing of the surface of said grains.

7. The process of etching the surface of fused crystalline aluminous abrasive grains which consists in heating said grains in contact with less than two per cent of sodium fluoride to a temperature sufficient to produce a surface reaction between said grains and said fluoride but insufficient to cause glazing of the surface of said grains.

8. The process of improving the bonding qualities of fused crystalline aluminous abrasive grains, which consists in heating said grains in contact with less than two per cent of sodium fluoride to a temperature sufficient to produce a surface reaction between said grains and said fluoride.

9. The process of improving the bonding qualities of fused crystalline aluminous abrasive grains, which consists in heating said grains in contact with less than two per cent of sodium fluoride to a temperature sufficient to produce a surface reaction between said grains and said fluoride but insufficient to cause the glazing of the surface of said grains.

In testimony whereof, I have hereunto set my hand.

MINER L. HARTMANN.